US009817567B2

(12) United States Patent
Matsunami

(10) Patent No.: US 9,817,567 B2
(45) Date of Patent: Nov. 14, 2017

(54) TOUCH PANEL DEVICE, PROCESS DETERMINATION METHOD, PROGRAM, AND TOUCH PANEL SYSTEM

(75) Inventor: Ryo Matsunami, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/417,995

(22) PCT Filed: Aug. 3, 2012

(86) PCT No.: PCT/JP2012/069887
§ 371 (c)(1),
(2), (4) Date: Jan. 28, 2015

(87) PCT Pub. No.: WO2014/020765
PCT Pub. Date: Feb. 6, 2014

(65) Prior Publication Data
US 2015/0160822 A1  Jun. 11, 2015

(51) Int. Cl.
G06F 3/041 (2006.01)
G06F 3/0488 (2013.01)
G06F 1/16 (2006.01)
G06F 3/0484 (2013.01)

(52) U.S. Cl.
CPC .......... *G06F 3/0488* (2013.01); *G06F 1/1626* (2013.01); *G06F 1/1643* (2013.01); *G06F 1/1647* (2013.01); *G06F 1/1692* (2013.01); *G06F 3/041* (2013.01); *G06F 3/04842* (2013.01); *G06F 3/04883* (2013.01); *G06F 2203/04808* (2013.01)

(58) Field of Classification Search
CPC ...... G06F 1/1626; G06F 1/1643; G06F 1/192; G06F 3/041; G06F 3/04842; G06F 3/04883; G06F 2203/04808

USPC ......................................................... 345/173
See application file for complete search history.

(56) References Cited

U.S. PATENT DOCUMENTS

2004/0004603 A1  1/2004 Gerstner et al.
2004/0019724 A1  1/2004 Singleton, Jr. et al.
2007/0229471 A1  10/2007 Kim et al.
(Continued)

FOREIGN PATENT DOCUMENTS

CN       1469265 A    1/2004
CN    102301317 A   12/2011
(Continued)

OTHER PUBLICATIONS

International Search Report for PCT Application No. PCT/JP2012/069887, dated Nov. 6, 2012.
(Continued)

*Primary Examiner* — Mark Regn

(57) ABSTRACT

A touch panel device includes: first and second touch panels that detect contact of an object, and a control unit that associates images that are displayed on the first touch panel and that indicate data with the display positions of the images on the first touch panel, and determines on the basis of the state of contact detected on the second touch panel, from among a plurality of types of processes that have been determined in advance, a process that is to be performed upon data indicated by a selected image that is an image that corresponds to the position of contact detected on the first touch panel.

7 Claims, 3 Drawing Sheets

(56) References Cited

U.S. PATENT DOCUMENTS

| | | |
|---|---|---|
| 2010/0295802 A1 | 11/2010 | Lee |
| 2011/0273387 A1 | 11/2011 | Urawaki et al. |
| 2011/0285632 A1* | 11/2011 | Arai .................... G06F 3/04883 345/168 |
| 2011/0285658 A1* | 11/2011 | Homma ................ G06F 1/1626 345/173 |
| 2012/0062564 A1 | 3/2012 | Miyashita et al. |

FOREIGN PATENT DOCUMENTS

| | | |
|---|---|---|
| EP | 2211530 A1 | 7/2010 |
| EP | 2395416 A1 | 12/2011 |
| JP | 2007-272904 A | 10/2007 |
| JP | 2007-293820 A | 11/2007 |
| JP | 2009-071735 A | 4/2009 |
| JP | 2009-187290 A | 8/2009 |
| JP | 2009-223426 A | 10/2009 |
| JP | 2010-108071 A | 5/2010 |
| JP | 2010-182046 A | 8/2010 |
| JP | 2012-173765 A | 9/2012 |
| WO | 2010/090106 A1 | 8/2010 |

OTHER PUBLICATIONS

The extended European search report of EP Application No. 12882178.2 dated Dec. 17, 2015.
Chinese Office Action for CN Application No. 201280074952.7 dated Nov. 28, 2016 with English Translation.
Japanese Office Action for JP Application No. 2011-031940 dated Jul. 1, 2014 with English Translation.

* cited by examiner

TOUCH PANEL DEVICE, PROCESS DETERMINATION METHOD, PROGRAM, AND TOUCH PANEL SYSTEM

This application is a National Stage Entry of PCT/JP2012/069887 filed on Aug. 3, 2012, which claims priority from Japanese Patent Application 2011-031940 filed on Feb. 17, 2011, the contents of all of which are incorporated herein by reference, in their entirety.

TECHNICAL FIELD

The present invention relates to a touch panel device that is provided with a touch panel, a process determination method, a program, and a touch panel system.

BACKGROUND ART

Recent years have seen the popularization of touch panel devices such as portable game devices and smartphones that incorporate touch panels and that enable intuitive manipulation by the operator. A touch panel has both the function of displaying images and the function of receiving input from the operator.

When any type of process is to be performed upon data indicated by an image displayed on the touch panel of a touch panel device, the operator first places his or her finger or a special stylus in contact with the image displayed on the touch panel to select the image. The operator next selects the type of processing, such as storage of the data, that is to be performed upon the data indicated by the image that was selected.

At this time, the operator must select the type of processing by using, for example, a menu screen for selecting the type of processing. In other words, the operator must know beforehand the operation for displaying a menu screen on the touch panel and is therefore unable to fully utilize the special advantage of the touch panel device, which is to enable intuitive operation.

Here, a technology is disclosed in, for example, Patent Document 1 for realizing control of an image that is displayed on a touch panel by operating an additional touch panel.

LITERATURE OF THE PRIOR ART

Patent Documents

Patent Document 1: Japanese Unexamined Patent Application Publication No. 2009-187290

SUMMARY OF THE INVENTION

If the technology disclosed by the above-described Patent Document 1 is used, data indicated by an image that has been selected by contacting one touch panel can be subjected to one type of processing by manipulating the other touch panel.

However, data indicated by an image that is displayed on a touch panel may be subjected to a number of types of processing, such as storage of the data, movement of the data, and deletion of the data.

Despite the use of the technology disclosed by Patent Document 1, a menu screen must still be used to select the type of process that the user wishes to execute, and the problem therefore still remains unsolved in which the special advantage of a touch panel device that enables intuitive operation is not fully utilized.

It is an object of the present invention to provide a touch panel device, a process determination method, a program, and a touch panel system that enable the execution of each of a plurality of types of processing by means of intuitive operation.

The touch panel device of the present invention for achieving the above-described object includes:
first and second touch panels that detect contact of an object; and
a control unit that associates images that are displayed on the first touch panel and that indicate data, with display positions of the images on the first touch panel, and that determines on the basis of the state of the contact that was detected on the second touch panel, from among a predetermined plurality of types of processes, a process that is to be performed upon the data indicated by a selected image that is an image that corresponds to the position of contact that was detected on the first touch panel.

The process determination method of the present invention for achieving the above-described object is a process determination method in a touch panel device that includes first and second touch panels that detect contact of an object and includes steps of:
associating images that are displayed on the first touch panel and that indicate data, with display positions of the images on the first touch panel; and
determining on the basis of the state of contact that was detected on the second touch panel, from among a predetermined plurality of types of processes, a process that is to be performed upon data indicated by a selected image that is an image that corresponds to the position of contact that was detected on the first touch panel.

The program of the present invention for achieving the above-described object causes a touch panel device that includes first and second touch panels that detect contact of an object to realize functions of:
associating images that are displayed on the first touch panel and that indicate data, with display positions of the images on the first touch panel; and
determining on the basis of the state of contact that was detected on the second touch panel, from among a predetermined plurality of types of processes, a process that is to be performed upon data indicated by a selected image that is an image that corresponds to the position of contact that was detected on the first touch panel.

The touch panel system of the present invention for achieving the above-described object includes:
a first touch panel device that is provided with a first touch panel that detects contact of an object; and
a second touch panel device that is provided with a second touch panel that detects contact of an object;
wherein the first touch panel device: both displays images that have been associated with a predetermined plurality of types of processes and associates images that are displayed with display positions of the images on the first touch panel; recognizes the image that corresponds to a position of contact that was detected on the first touch panel as a selected image; selects any process from among the plurality of types of processes that are associated with the selected image based on the state of contact that was detected on the second touch panel, and executes the selected process.

EXPLANATION OF REFERENCE NUMBERS 10, 20 touch panel device
11 control unit
12 storage unit
13 outside connection unit
14, 15 touch panel

EXEMPLARY EMBODIMENT

Exemplary embodiments of the present invention are next described with reference to the accompanying drawings.

First Exemplary Embodiment

Figure 1:
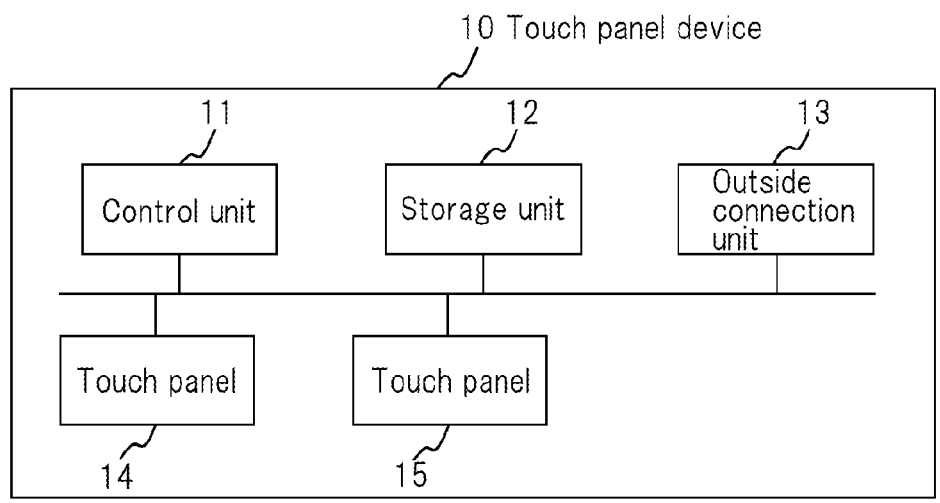
FIG. 1 is a block diagram showing the configuration of the first exemplary embodiment of the touch panel device of the present invention.
Figure 2:
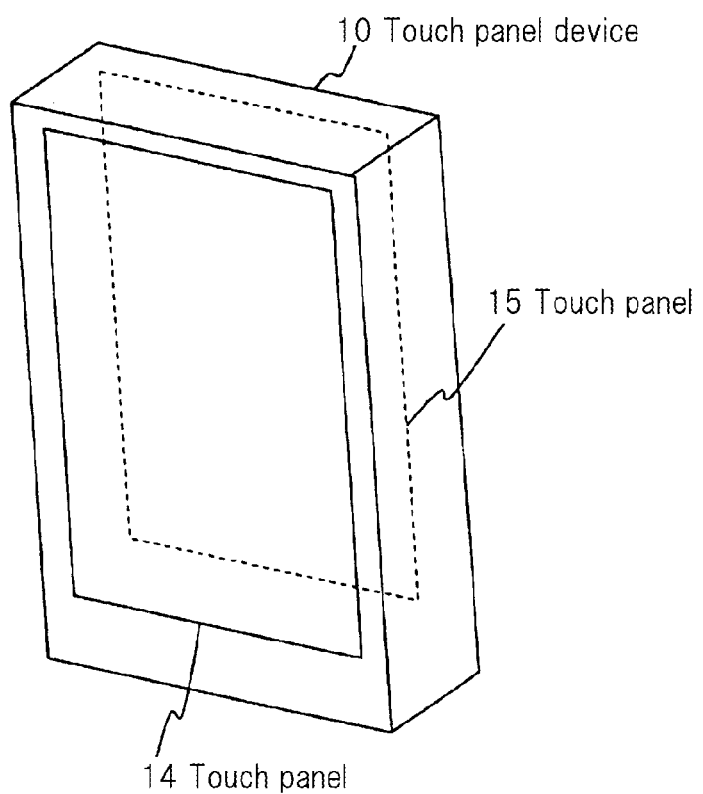
FIG. 2 is an external view of the touch panel device shown in FIG. 1.

FIG. 1 is a block diagram showing the configuration of the first exemplary embodiment of the touch panel device of the present invention. In addition, FIG. 2 is an external view of touch panel device 10 shown in FIG. 1.

As shown in FIG. 1, touch panel device 10 of the present exemplary embodiment is provided with control unit 11, storage unit 12 in which a plurality of folders is set; outside connection unit 13, touch panel 14 that is the first touch panel, and touch panel 15 that is the second touch panel. As shown in FIG. 2, the first touch panel and the second touch panel are provided on mutually opposite surfaces of touch panel device 10.

Storage unit 12 is, for example, a hard disk drive (HDD).

Outside connection unit 13 is provided with a communication function for connecting to the Internet and a function for connecting touch panel device 10 to an outside apparatus such as a personal computer.

Touch panel 14 displays images that indicate data that are stored in storage unit 12, images that indicate data on a Web site of the Internet that can be consulted by way of outside connection unit 13, and images that indicate data on an outside apparatus. "Images" here refers specifically to images such as icon images and thumbnail images. The operator of touch panel device 10 (hereinbelow referred to as simply "the operator") makes contact with touch panel 14 by means of an object such as his or her finger to select images that are displayed. Touch panel 14 detects contact that is made by the operator's finger and supplies first detection information that indicates the position of the contact that was detected to control unit 11. In addition, the operator is further able to select a plurality of images by using more than one finger to make contact with touch panel 14. Still further, the operator is able to select a plurality of images as a group by sliding his or her finger across touch panel 14 while keeping the finger in contact with touch panel 14. In this case, touch panel 14 supplies to control unit 11 first detection information that takes the sliding range of the finger as the position of contact that was detected.

Touch panel 15 detects contact that is made by the operator's finger. Touch panel 15 then supplies to control unit 11 information indicating the state of contact that was detected as the second detection information. More specifically, touch panel 15 supplies to control unit 11 information that indicates the number of positions of contact that was detected as the second detection information.

Control unit 11 stores the images that are displayed on touch panel 14 in association with the display positions of these images on touch panel 14. In addition, control unit 11 receives the first detection information that was supplied from touch panel 14 and recognizes the image that corresponds to the position of contact indicated by the first detection information that was received as a selected image that has been selected by the operator. In addition, upon receiving the second detection information that was supplied from touch panel 15, control unit 11 determines according to the number indicated by the second detection information that was received, from among the plurality of types of processes that have been determined in advance, the process that is to be performed upon the data indicated by the selected image that was recognized. An example of the plurality of types of processes that have been determined in advance will be described in the flow of operations hereinbelow.

The operations of touch panel device 10 that is configured as described hereinabove is next described.

Figure 3:
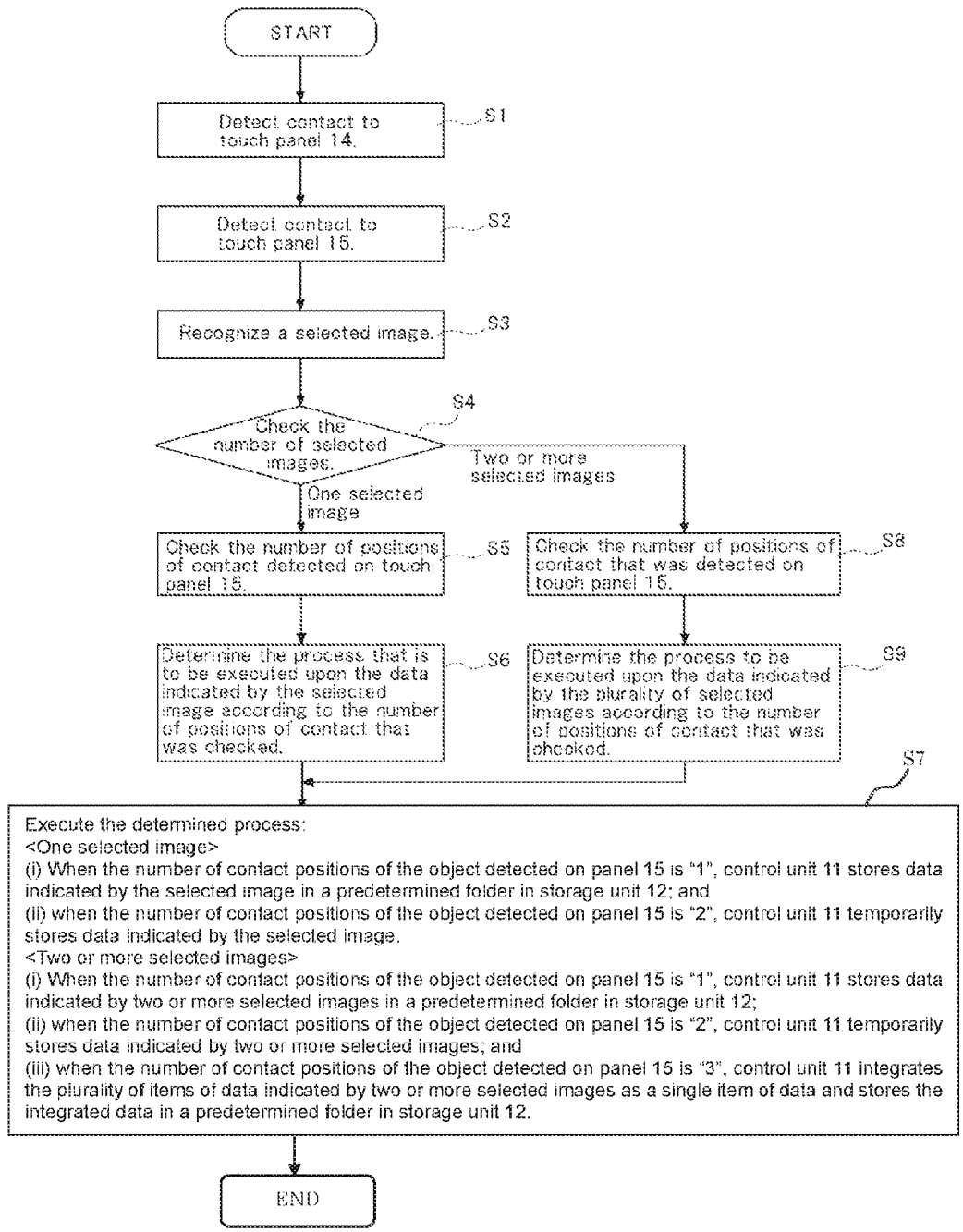
FIG. 3 is a flow chart for describing the operation of the touch panel device shown in FIG. 1 and FIG. 2.

FIG. 3 is a flow chart for describing the operations of touch panel device 10 shown in FIG. 1 and FIG. 2. A case is here described in which connection is established with the Internet by way of outside connection unit 13 and a plurality of images that respectively indicate a plurality of items of data provided by a Web site is displayed on touch panel 14.

The operator selects at least one image from among the plurality of images displayed on touch panel 14 by using his or her finger to make contact with touch panel 14 or by sliding his or her finger while maintaining contact. In addition, the operator uses, for example, his or her finger to make contact with touch panel 15. The operator may first make contact with touch panel 14 or touch panel 15.

Touch panel 14 detects the contact (Step S1) and supplies first detection information that indicates the contact that was detected to control unit 11.

Touch panel 15 detects the contact (Step S2) and supplies to control unit 11 second detection information that indicates the number of positions of contact that was detected.

Control unit 11 receives the first detection information that was supplied from touch panel 14 and the second detection information that was supplied from touch panel 15.

Control unit 11 then recognizes the image that corresponds to the position of contact that is indicated by the first detection information that was received as the selected image (Step S3).

Control unit 11 next checks the number of selected images (Step S4).

If, as a result of checking in Step S4, the number of selected images is one, control unit 11 checks the number indicated by the second detection information that was received. In other words, control unit 11 checks the number of positions of contact that was detected on touch panel 15 (Step S5).

Control unit 11 then determines according to the number that was checked in Step S5, from among the plurality of types of processes that were determined in advance as processes that are executed when there is one selected image, the process that is to be performed upon the data indicated by the selected image that was recognized in Step S3 (Step S6).

Control unit 11 then executes the process that was determined (Step S7). More specifically, when the number indicated by the second detection information that was received is "1," control unit 11 downloads the data indicated by the selected image that was recognized in Step S3 from a Web site and stores the data in a predetermined folder from among the plurality of folders that have been set in storage unit 12. Alternatively, when the number indicated by the second detection information that was received is, for example, "2," control unit 11 downloads from a Web site the data that are indicated by the selected image that was recognized in Step S3 and temporarily stores the data.

On the other hand, if, as a result of the check in Step S4, the number of selected images is greater than "1," control unit 11 checks the number indicated by the second detection information that was received. In other words, control unit 11 checks the number of positions of contact that was detected on touch panel 15 (Step S8).

Control unit 11 then determines according to the number that was checked in Step S8, from among the plurality of types of processes that were determined in advance as processes that are executed when there is a plurality of selected images, the process that is to be performed upon the plurality of items of data respectively shown by the plurality of selected images that were recognized in Step S3 (Step S9).

The process then transitions to Step S7, and control unit 11 executes the process that was determined. More specifically, when the number indicated by the second detection information that is received is "1," control unit 11 downloads from a Web site the plurality of items of data that are respectively indicated by the plurality of selected images that were recognized in Step S3 and stores the data in a predetermined folder from among the plurality of folders that have been set in storage unit 12. When the number indicated by the second detection information that was received is, for example, "2," control unit 11 downloads from a Web site the plurality of items of data that are respectively indicated by the plurality of selected images that were recognized in Step S3 and temporarily stores the data. When the number indicated by the second detection information that was received is, for example, "3," control unit 11 integrates the plurality of items of data that are respectively indicated by the plurality of selected images that were recognized in Step S3 as one item of data and stores the data in a predetermined folder from among the plurality of folders that have been set in storage unit 12. The integration of the plurality of items of data is, for example, the integration of a plurality of items of text data or a plurality of items of PDF (Portable Document Format) data. The integration of the plurality of items of data here described also includes the integration of a plurality of items of image data. In this case, a plurality of images based on the plurality of items of image data is synthesized to produce a single image.

Touch panel device 10 in the present exemplary embodiment as thus described includes touch panels 14 and 15 that detect when an object makes contact with them. Touch panel device 10 further includes control unit 11 that associates images that are displayed on touch panel 14 and that indicate data, with the display positions of the images on touch panel 14.

Control unit 11 then determines, from among a plurality of types of processes that have been determined in advance, the process that is to be performed upon the data indicated by a selected image that is an image that corresponds to the position of contact that was detected on touch panel 14, based on the state of contact that was detected on touch panel 15.

There is consequently no need to use a menu screen to select the type of process that the operator wishes to execute. Accordingly, each of a plurality of types of processes can be executed by intuitive operations.

In addition, by providing touch panel 14 and touch panel 15 on mutually opposite surfaces of touch panel device 10 as shown in FIG. 2, the operator carries out operation of touch panel device 10 while holding touch panel device 10 interposed between his or her fingers. The danger of dropping touch panel device 10 is thus reduced.

Although an example has been described in the present exemplary embodiment in which the storage of data or the integration of a plurality of items of data was described as the predetermined plurality of types of processes that control unit 11 carries out, these types of processes are only examples, and the processes executed by control unit 11 are not limited to these examples.

In addition, if the touch panel device of the present exemplary embodiment is applied to a portable terminal, the operability when entering characters on the portable terminal can be improved. More specifically, a keyboard is displayed on touch panel 14. Then, when the operator touches the displayed keyboard with his or her finger to enter characters, a case in which the number of positions of contact detected on touch panel 15 is, for example, "1" is taken as the state in which the Shift key is pressed, and a case in which the number of positions of contact that is detected on the second touch panel is "2" is taken as the state in which both the Shift key and ctrl key are pressed. Thus, when performing character input, the operator does not need to carry out screen operations to realize a state that is otherwise realized by pressing the shift key or the ctrl key.

In addition, although a case has been described regarding a touch panel device in which two touch panels are provided on a single case in the present exemplary embodiment, the present invention can be applied to a touch panel system made up from, for example, two touch panel devices each provided with one touch panel.

For example, a game device to which the touch panel system is applied will be considered. In this game device, the operator of one touch panel device uses his or her finger to make contact with the touch panel in order to select any image from among a plurality of images that are displayed on the touch panel, whereby the selected image is recognized. Each of this plurality of images is an image indicating, for example, an item that can be selected in a role-playing game. The operator of the other touch panel device then uses his or her finger to make contact with the touch panel of the touch panel device. According to the number of fingers that made contact with the touch panel at this time, any one type from among a plurality of types of stories, that have been associated with the selected image and that have been set in advance to the item indicated by the selected image, is selected, and the game proceeds with the selected story. In this way, a plurality of players can share and enjoy a game.

Alternatively, a game device that realizes a True/False quiz is regarded as a case to which the above-described touch panel system is applied. In this game device, a plurality of images each showing a respective statement is displayed on the touch panel of one touch panel device. The operator of the touch panel device then uses his or her finger, for example, to make contact with the touch panel in order to select any one image from among the plurality of images that is displayed, whereby the selected image is recognized, and further, the statement shown by the selected image is displayed on the touch panel of the other touch panel device.

The operator of the other touch panel device then uses one finger, for example, to make contact with the touch panel when he or she believes the displayed statement is True, and uses two fingers, for example, to make contact with the touch panel when he or she believes the statement is False. In this way, any one type from among a plurality of types of processes, that have been associated with selected images and that have been set in advance according to True/False regarding the statement shown by the selected image, is selected, and the selected process is performed.

Second Exemplary Embodiment

Figure 4:
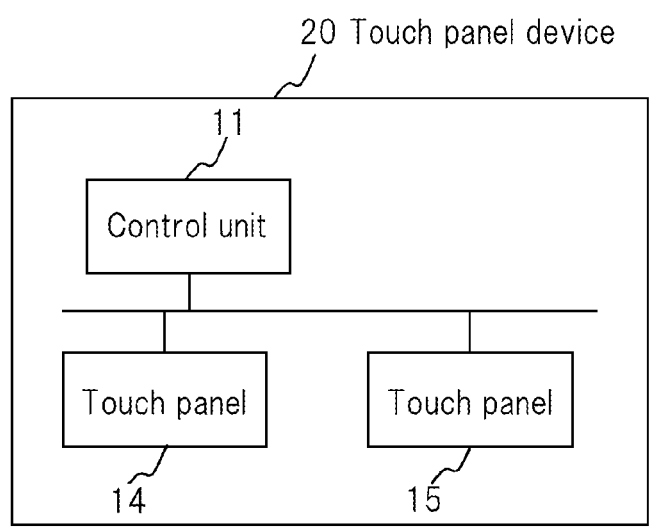
FIG. 4 is a block diagram showing the configuration of the second exemplary embodiment of the touch panel device of the present invention.

FIG. 4 is a block diagram showing the configuration of the second exemplary embodiment of the touch panel device of the present invention. In FIG. 4, elements of the configuration that are identical to elements shown in FIG. 1 are given the same reference numbers.

Touch panel device 20 in the present exemplary embodiment includes touch panels 14 and 15 that detect when an object makes contact with them. Touch panel device 20 further includes control unit 11 that associates images that are displayed on touch panel 14 and that indicate data with the display positions of these images on touch panel 14.

Control unit 11 then determines, from among a plurality of types of processes that have been determined in advance, the process that is to be performed upon data that are shown by a selected image that is an image corresponding to the position of contact that was detected on touch panel 14 based on the state of contact that was detected on touch panel 15.

In this way, the operator does not need to use, for example, a menu screen to select the type of process that he or she wishes to execute. Accordingly, each of a plurality of types of processes can be executed by intuitive operations.

In the above-described first and second exemplary embodiments, examples were described in which, from among a plurality of types of processes that were determined in advance, a process that is to be performed upon data indicated by a selected image is determined according to the number of positions of contact detected on touch panel 15. However, the process that is to be performed upon the data indicated by a selected image is not limited to being determined according to the number of positions of contact. For example, when the operator slides his or her finger while maintaining contact with touch panel 15, touch panel 15 detects the track of this sliding as contact. Control unit 11 may then determine the process that is to be performed upon data indicated by the selected image according to, for example, the shape and length of this track.

As one example, when the track detected as contact on touch panel 15 is circular, touch panel 15 supplies information indicating this circular track as the second detection information to control unit 11. Alternatively, when the track detected as contact on touch panel 15 is linear, touch panel 15 supplies information indicating this linear track as the second detection information to control unit 11. Control unit 11 then determines, from among the plurality of types of processes that have been determined in advance, the process that is to be performed upon data indicated by the selected image based on the information indicated by the second detection information that was received.

Alternatively, the operator may also, for example, use his or her finger a plurality of times to make contact with touch panel 15, and the process that is to be performed upon the data indicated by the selected image may then be determined according to the number of times of contact or the time interval of the contact.

In the present invention, the processing in the touch panel device may be realized by, apart from the above-described dedicated hardware, recording a program for realizing the functions of the present invention on a recording medium that can be read in the touch panel device and then having the program that was recorded on this recording medium read into and executed by the touch panel device. The recording medium that can be read by the touch panel device refers to a removable recording medium such as a flexible disk, a magneto-optical disk, a DVD, or a CD, or may refer to an HDD that is incorporated in the touch panel device.

Although the present invention has been described with reference to exemplary embodiments, the present invention is not limited to the above-described exemplary embodiments. The configuration and operation of the present invention are open to various modifications within a scope that does not depart from the gist of the present invention and that will be clear to one of ordinary skill in the art.

This application incorporates by citation all of the disclosures of Japanese Patent Application No. 2011-031940 for which application was submitted on Feb. 17, 2011.

What is claimed is:

1. A touch panel device comprising:
   first and second touch panels, each of the first and second touch panels being configured to detect a contact therewith, wherein the first touch panel is further configured to display a plurality of images, wherein each of the plurality of images is associated with a stored data item; and
   a control unit that associates each of the plurality of images with a respective display position on said first touch panel; that selects from among said plurality of images, a first selected image and a second selected image based on a first contact position and a second contact position detected by said first touch panel, respectively; that determines, from among a predetermined plurality of types of processes, a selected process that is to be performed based on a contact state of an object detected by said second touch panel; and that executes the selected process on a first data item associated with the first selected image and on a second data item associated with the second selected image, wherein the plurality of types of processes comprise a process of storing the first data item and the second data item, a process of deleting the first data item and the second data item, and a process of integrating the first data item and the second data item.

2. The touch panel device as set forth in claim 1, wherein said control unit determines the selected process from among the plurality of types of processes based on a number of contact positions of said object detected by said second touch panel.

3. The touch panel device as set forth in claim 2, further comprising a storage unit;
   wherein said control unit stores the first data item and the second data item in said storage unit when the number of contact positions of said object detected by said second touch panel is a first number.

4. The touch panel device as set forth in claim 3, wherein: said control unit integrates the first data item and the second data item as a single item of data and stores the single item of data in said storage unit when the number of contact positions of said object detected by said second touch panel is a second number.

5. The touch panel device as set forth in claim 1, wherein said first touch panel and said second touch panel are provided on mutually opposite surfaces of the touch panel device.

6. A process determination method in a touch panel device that includes first and second touch panels, each of the first and second touch panels being configured to detect a contact therewith, said method comprising:
- displaying a plurality of images on said first touch panel, wherein each of said plurality of images is associated with a stored data item;
- associating each of a plurality of images with a respective display position on said first touch panel;
- selecting, from among said plurality of images, a first selected image and a second selected image based on a first contact position detected by said first touch panel and a second contact position detected by said first touch panel, respectively;
- determining, from among a predetermined plurality of types of processes, a selected process that is to be performed based on a contact state of an object detected by said second touch panel; and
- executing the selected process on a first data item associated with the first selected image and on a second data item associated with the second selected image,
- wherein the plurality of types of processes comprise a process of storing the first data item and the second data item, a process of deleting the first data item and the second data item, and a process of integrating the first data item and the second data item.

7. A non-transitory computer-readable storage medium storing thereon a program used in a computer of a touch panel device that includes first and second touch panels, each of the first and second touch panels being configured to detect a contact therewith, said program causing the computer to execute processes of:
- displaying a plurality of images on said first touch panel, wherein each of said plurality of images is associated with a stored data item;
- associating each of a plurality of images with a respective display position on said first touch panel;
- selecting, from among said plurality of images, a first selected image and a second selected image based on a first contact position detected by said first touch panel and a second contact position detected by said first touch panel, respectively;
- determining, from among a predetermined plurality of types of processes, a selected process that is to be performed based on a contact state of an object detected by said second touch panel; and
- executing the selected process on a first data item associated with the first selected image and on a second data item associated with the second selected image,
- wherein the plurality of types of processes comprise a process of storing the first data item and the second data item, a process of deleting the first data item and the second data item, and a process of integrating the first data item and the second data item.

* * * * *